Aug. 18, 1959     G. A. PATKAU     2,899,944
ROTARY INTERNAL COMBUSTION ENGINE
Filed July 25, 1955                 6 Sheets-Sheet 4

Inventor
GEORGE A. PATKAU
By: Featherstonhaugh & Co.
Att'ys

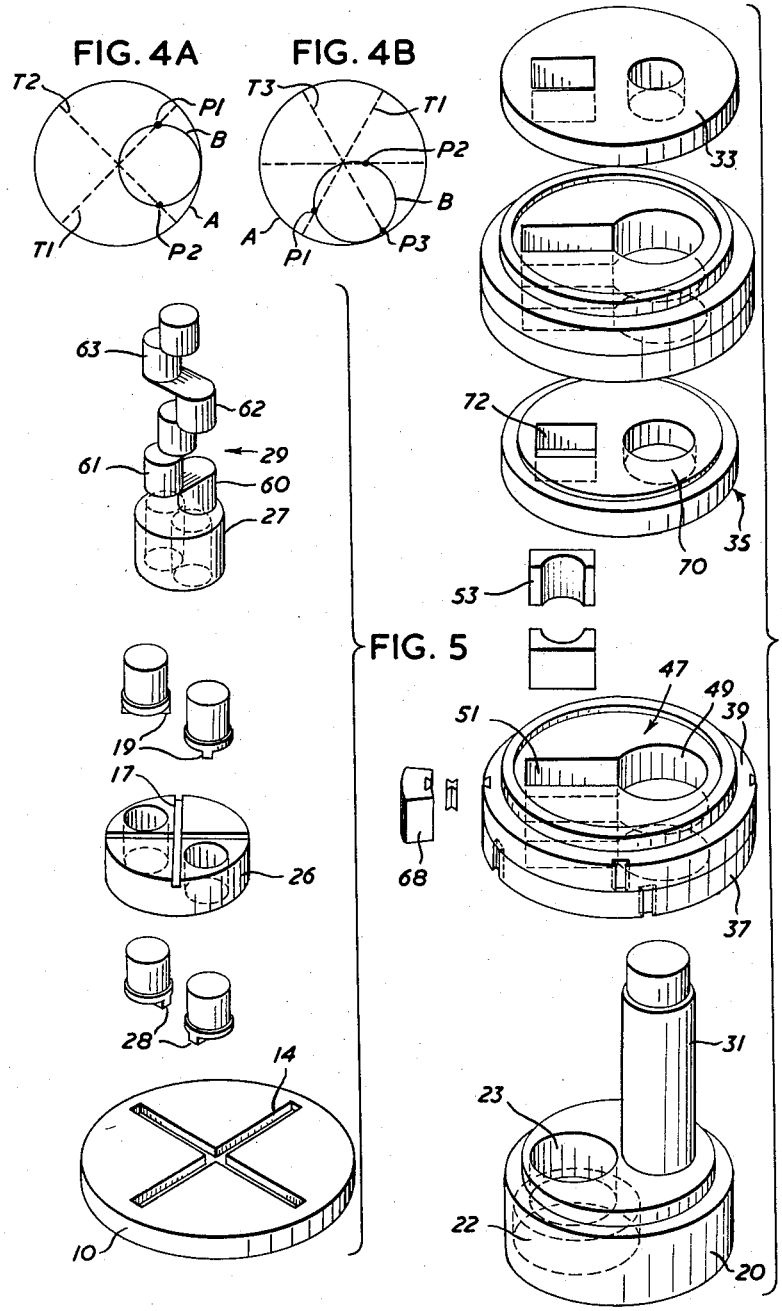

Aug. 18, 1959 G. A. PATKAU 2,899,944
ROTARY INTERNAL COMBUSTION ENGINE
Filed July 25, 1955 6 Sheets-Sheet 6

Inventor
GEORGE A. PATKAU
By: Fetherstonhaugh & Co.
Att'ys

United States Patent Office 2,899,944
Patented Aug. 18, 1959

2,899,944
ROTARY INTERNAL COMBUSTION ENGINE
George A. Patkau, Windsor, Ontario, Canada
Application July 25, 1955, Serial No. 524,176
3 Claims. (Cl. 123—11)

This invention relates to a rotary internal combustion engine of the type sometimes known as the free piston engine.

The invention provides a housing containing an annular combustion chamber defined by a circumferential channel in the housing and the peripheral surfaces of a pair of co-axial rotors, each of said rotors mounting an equal number of vanes which project into said combustion chamber and act as pistons. These pistons, attached to the respective rotors, are located alternately around the circumference of said chamber. A crank arm for interconnecting the pistons causes them to approach and recede from each other as they revolve around inside said combustion chamber. The approach and recession of the said pistons is synchronized to correspond to the passage by the rotors of suitable inlet and outlet ports so that the approach and recession allows the carrying out of intake, compression, expansion and exhaust operations in the chambers defined between adjacent pistons as they rotate about the combustion chamber. A number of grooves are provided in one of the ends of the housing, running at right angles to the axis of said rotors, said grooves intersecting at a common point equiangularly on the axis of the rotor. A datum member is rotatably mounted co-axially with the rotors having a coupling member eccentrically and rotatably mounted thereon. A corresponding number of studs pivotally mounted on the coupling member are adapted to ride in said respective intersecting grooves during the rotation of said datum member and the studs are so located on said coupling member and the coupling member so located on the rotating member that the path of each stud in its innermost radial travel during the rotation of said coupling member relative to said rotating member intersects the axis of rotation of said rotating member. The effect of the groove stud drive provides a 2 to 1 rotation of the crank arm relative to the datum member.

Preferably the housing supplies the slidable mounting for the rotors and for the datum member.

In the drawings which illustrate embodiments of the invention:

Figure 4A is a cross-section taken at the location of the line 3—3 of Figure 1 but at a different time in the cycle from the time represented by the part locations in Figures 1–3.

Figures 4A and 4B are diagrammatic sketches illustrating the coupling principle for the connecting rod.

Figure 5 is an exploded view of the coupling members.

Figure 6 is an exploded view of the rotor and vane construction.

In Figures 4A and 4B are shown two circles A and B with the circle A twice the diameter of circle B. In Figure 4A points P1 and P2 located on the circumference of circle B, are made to trace out their travel during the rotation of circle B in circle A. It will be seen that the points P1, P2, trace out two diameters of circle A at right angles to one another as indicated by the traces T1, T2. Thus it is seen that if the traces T1, T2 are physically represented by grooves while the points P1, P2 are represented by studs riding in said grooves then a mechanical drive may be achieved between the physical member represented by circle B, the movement being equivalent to a 2 to 1 gear drive. Such a drive is incorporated in this invention. In Figure 4B is shown a similar connection using three equiangularly spaced tracings, T1, T2, T3, co-operating with points P1, P2, P3, it being noted that the equivalent gear drive is still 2:1.

Figure 1:
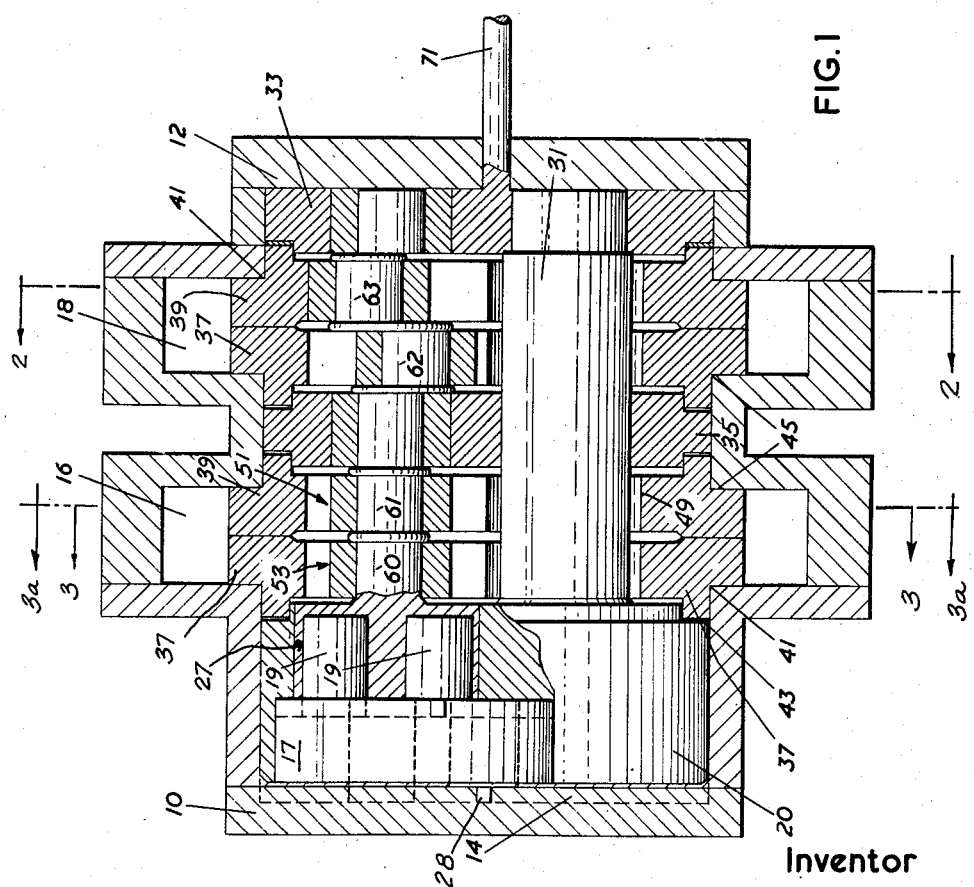
Figure 1 is a cross-section parallel to the rotary axis of the engine.

In Figure 1 is shown a housing having end plates 10 and 12 and a peripheral side plate of cylindrical shape having a pair of rectangular combustion chambers 16 and 18 extending peripherally about and opening into the inside of the cylinder. End plate 10 is provided with a pair of grooves 14 intersecting at right angles, said intersection taking place on the longitudinal axis of the housing. A cylindrical block 20 is rotatably slidable in the housing between the chambers and the end plate 10, and is provided with a cylindrical recess 22 at the end adjacent the intersecting grooves with a recess adapted to receive a circular coupling member 26, said coupling member 26 being rotatably slidably mounted in said recess 22 and pivotally mounting two projecting studs 28 adapted to ride in the intersecting grooves 14. The coupling member 26 is so located relative to the axis of the block 20 that the path of each stud 28 in its innermost radial travel during the rotation of the coupling member 26 relative to the block 20 intersects the axis of the housing cylinder. The block 20 remote from the intersecting grooves is recessed at 23 to receive a second coupling member 27 adapted to slidably rotate therein. Intersecting grooves 17 in the first coupling member 26 cooperate with rotatably mounted studs 19 in the second coupling member 27. The second coupling member 27 and its corresponding recess 23 are located relative to the recess 22 in the same manner that coupling member 26 is located relative to the intersecting grooves 14, that is, recess 22 is so located that studs 19, in the rotation of coupling member 27 relative to coupling member 26, in their innermost radial travel, intersect the axis of the grooves 17.

By this connection a 4 to 1 multiplication of rotational speed is obtained in the coupling member 27 relative to the rotation of the block 20. By eliminating one of the coupler stages a 2 to 1 ratio would be obtained.

Attached to the second coupling member and projecting toward the end plate 12 is a crank arm 29 provided with links 60 to be described hereinafter. Projecting from the block 20 toward the end plate 12 in a position preferably diametrically opposed to the crank arm is a connecting arm 31 to be seated in rotating support 33. Rotating support 33 and block 20 are slidably rotatably mounted on the housing by their peripheral surfaces and therefore rotate with the connecting arm 31 and with the axis of the crank arm 29. Similarly mounted on the crank arm 29 and on the connecting arm 31 is a support plate 35 adapted to slidably rotate relative to the housing at the point where such housing narrows between the combustion chambers.

Twin rotors 37 and 39 are adapted to rotate in co-operation with each combustion chamber. Each rotor is provided with a circular periphery adapted to rotate slidably on the housing. The rectangular edges 41 of the housing defining the axial direction extremities of the combustion chamber co-operate with rectangular notches 43, 45, in one side respectively of each rotor 37, 39. Thus the two rotors 37, 39, together are slidably rotatably mounted on the housing. Each rotor is provided with a keyway 47, having a circular outline 49 at one end and a rectangular slot 51 extending radially of the rotor at the other. Adapted to slidably move in the rectangular portion of the keyway are coupler blocks 53 having a rectangular outline to correspond to the keyway slot 51 and a cylindrical bore in the centre to receive one link 60 of the crank arm 29.

Figure 2:
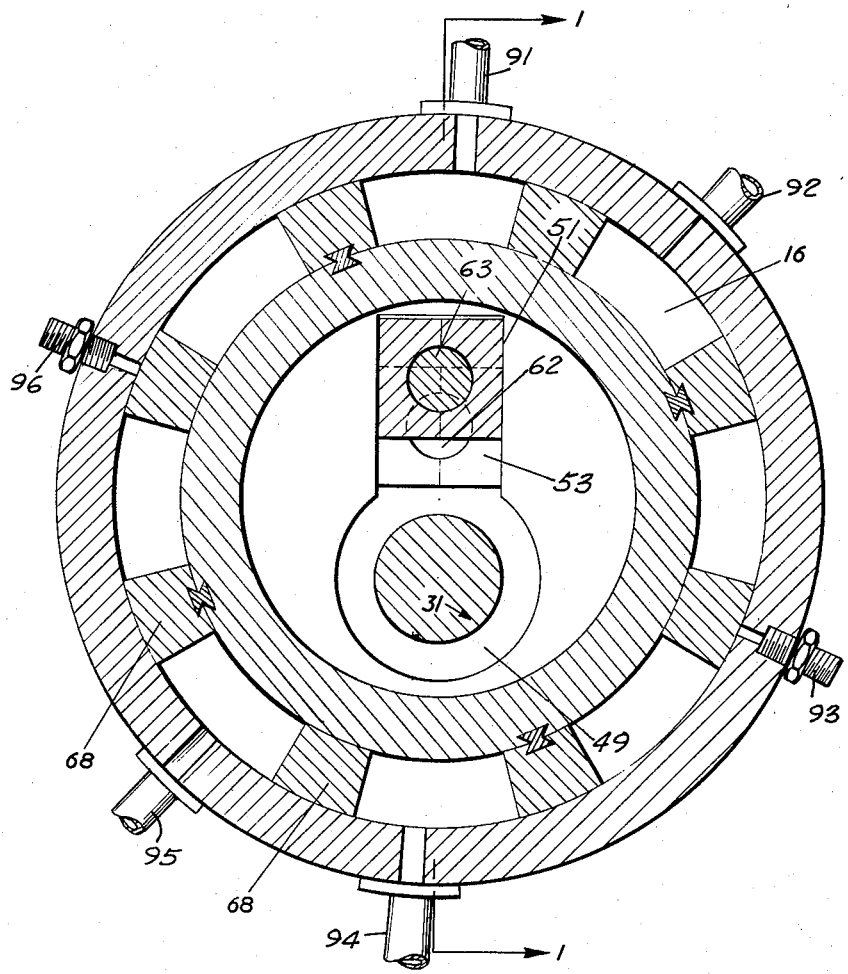
Figure 2 is a cross-section taken along the line 2—2 of Figure 1.
Figure 3:
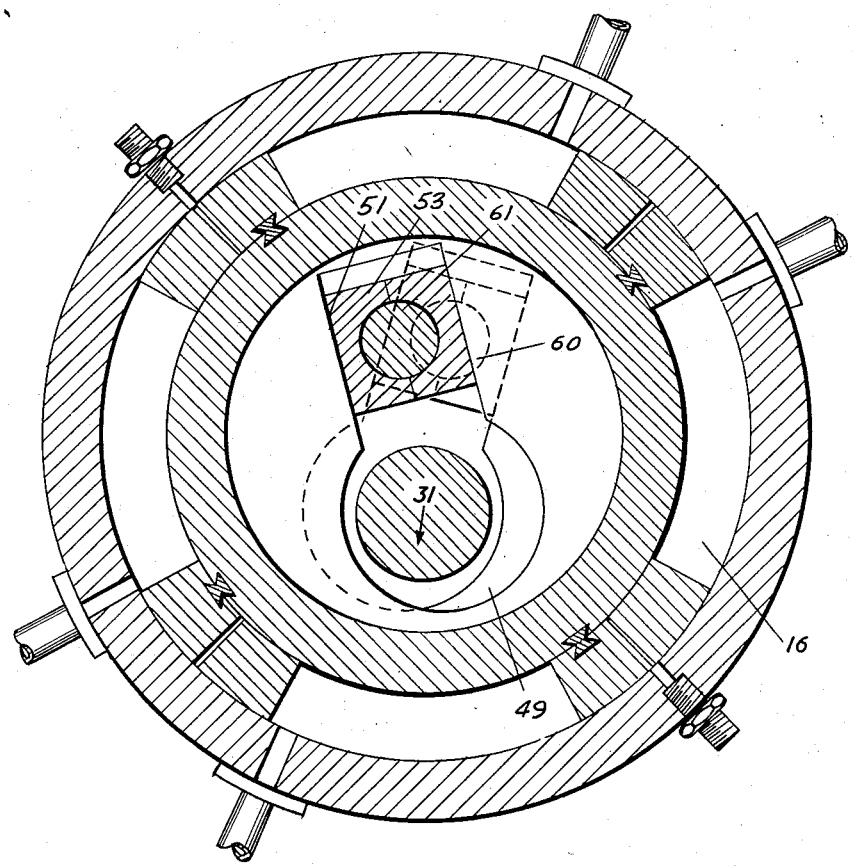
Figure 3 is a cross-section taken along the line 3—3 of Figure 1.
Figure 3A:
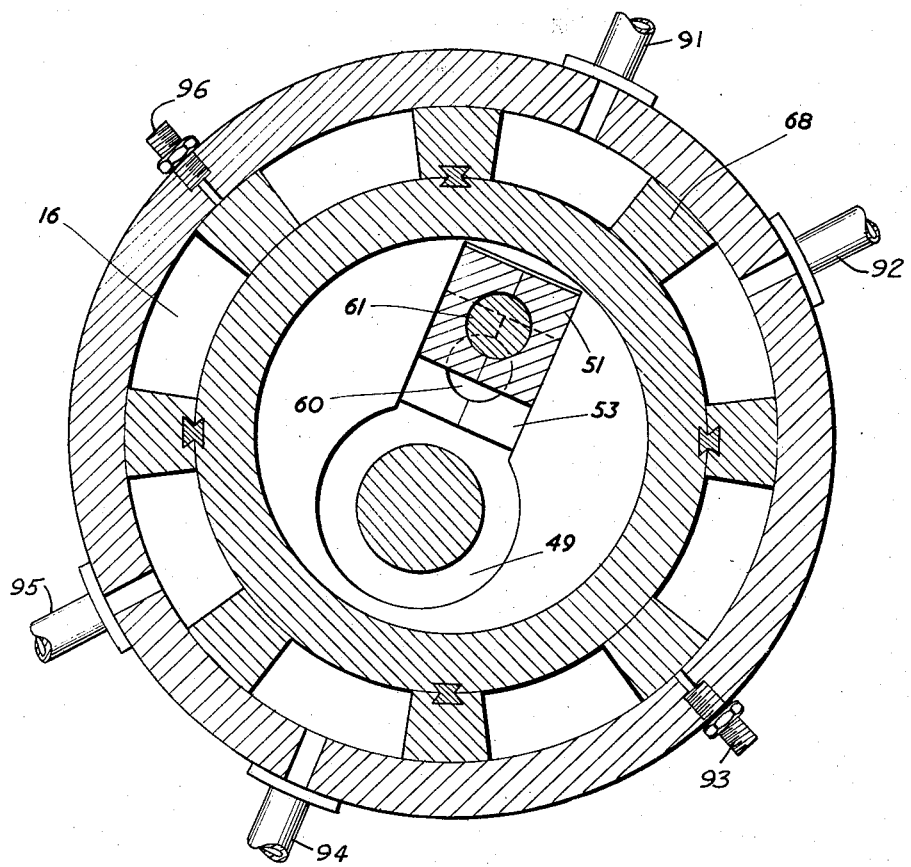

Each rotor therefore is rotated in accord with the angular displacement of its respective crank shaft link, as shown in Figure 2. In order that the combustion engine may have even operation, the four operative links of the crank shaft are each displaced at 90° to one another. Thus, as shown in Figure 1, the third operative link 62 is downward, the fourth operative link 63 is upward, the first operative link 60 is out of the sheet and the second operative link 61 is into the sheet. In order to prevent any interaction between the connecting arm 31 and the rotors 37, 39, the rotors are provided with the large circular aperture 49 to allow passage of the connecting arm 31 in any angular location of the rotors relative thereto without interference between the connecting arm and the rotors.

As indicated in Figure 2, each rotor is provided with four vanes 68 which are attached to the rotor by appropriate means and each vane 68 is adapted to extend across the whole combustion chamber 16 or 18 so that the vane projects across the companion rotor. Thus the eight vanes on the two rotors divide the combustion chamber into eight chambers.

Intermediate support plate 35 is provided with a circular aperture 70 to receive the connecting rod and a rectangular aperture to receive the crank arm. The intermediate support 35 is designed to rotate with the block 20, the support member 33, the crank shaft 29 axis and the connecting rod 31 and no relative movement between support 35 and connecting rod 31 is allowed by the coupling therebetween.

Although it forms no part of this invention the air intake, fuel intake and exhaust means will now be discussed:

In such a discussion the upper central location on the periphery of chamber 16 or 18 will be referred to as 0° and the degrees of angle will be described measuring clockwise. Moreover the individual pistons 68 as shown in Figure 2 have been lettered A to H for easy reference in the operational schematic drawings in Figures 7–15.

As illustrated the chambers 16 and 18 (16 being shown) are provided with exhaust ports 91 and 94 just counter-clockwise of 0° and 180° respectively. Similarly the chambers 16—18 are provided with intake ports 92 and 95 just clockwise of 0° and 180° respectively and with fuel injection nozzles 93 and 96.

Figure 7:
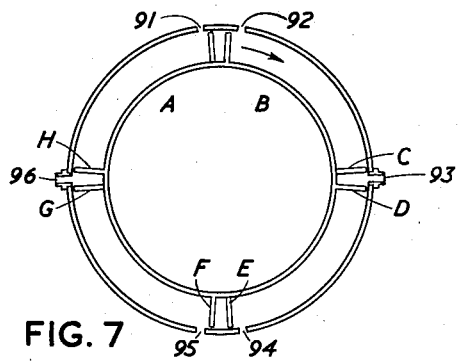
Figure 8:
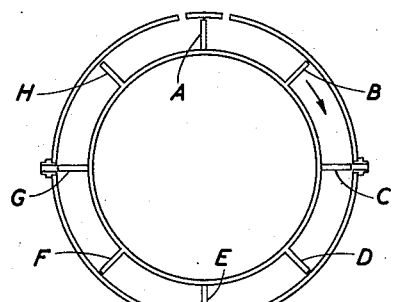

The vanes 68 in each chamber, as heretofore explained, approach and recede from one another, four times during a revolution their travel under the control of links 60—61 being illustrated in Figures 7–15, the position of the vanes as illustrated in Figure 2 corresponding to the position shown in Figure 8 the difference in vane size and in proximity of the vanes across each of the 0°, 90°, 180° and 270° locations as shown in these two figures, affecting the compression ratio but not the principle of operation.

Figure 9:
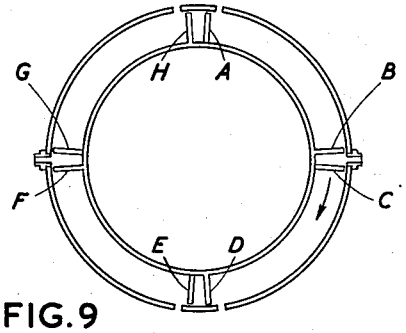

The operation of the device is as follows:

Under the actuation of links 60—61 the vane B moves past air intake opening 92 from the position shown in Figure 7 through the positions shown in Figures 8 and 9 while the vane A is moving only very slightly clockwise between exhaust port 91 and inlet port 92.

The chamber A—B, is therefore expanding during the above sequence and drawing in air through port 92.

Figure 10:
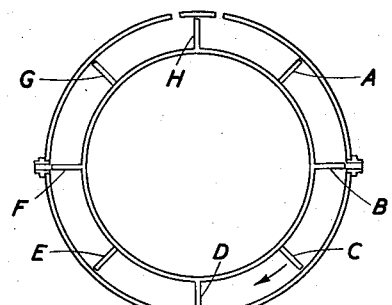
Figure 11:
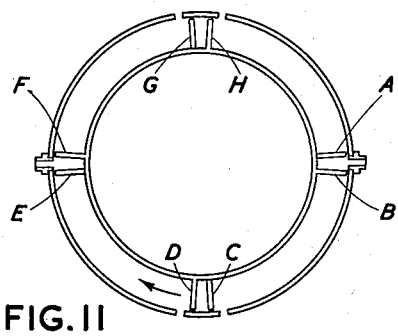

Further actuated by the links and as illustrated in Figures 9 to 11 the vane A moves almost 90° clockwise to a position somewhat short of the position 90° while the vane B is moving a very small distance clockwise past the fuel injection nozzle.

The air in chamber A—B is thus compressed to the amount of the compression ratio, causing a considerable increase in its temperature. The compression ratio may be easily calculated by taking the ratio of the angular spacings of the vanes A—B in Figure 9 and in Figure 11, or, and what is the same mathematically, taking the ratio of the angular spacings of the vanes A—B and the vanes B—C in Figure 9.

The compression ratio is preferably such, that the air in chamber A—B is heated by compression to a temperature higher than the ignition temperature of the fuel to be injected from nipple 93 so that no outside ignition means is necessary. Although this is the embodiment shown it will be understood that, if the compression ratio is sufficiently low that the fuel will not be self-ignited, then a synchronously actuated spark gap may be provided adjacent the fuel injection nozzle.

Figure 12:
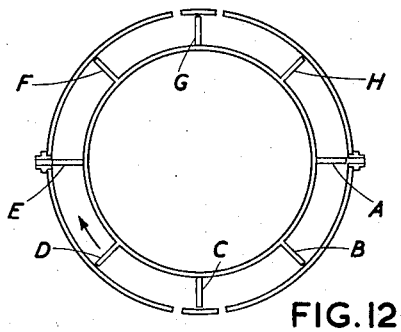
Figure 13:
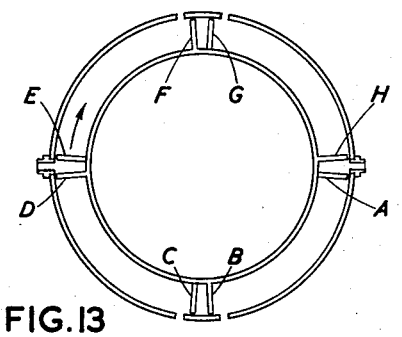

Continuing with the operation from the time when, as shown in Figure 11, the air in chamber A—B has just been compressed to above the ignition temperature of the fuel, and the chamber is opposite the fuel injection nozzle 93, synchronous means causes the injection of fuel into the chamber A—B; it being immediately ignited to drive vane B away from vane A in a clockwise direction as illustrated in Figures 11 to 13, the expansion driving one of the rings 37, 39 with respect to the other and causing rotation of connecting rod 31, of shaft 71 and crank arm 29 with the consequent rotation of the vane rotors 37—39 for each combustion chamber 16 and 18.

Figure 15:
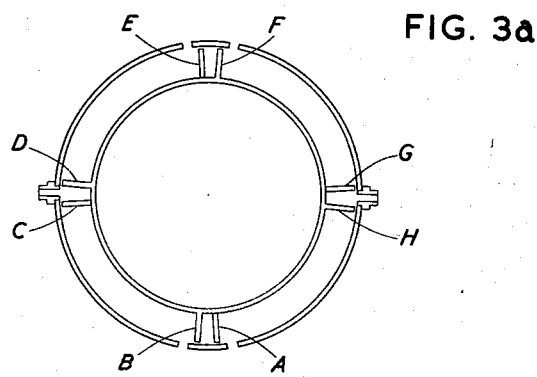
Figures 7–15 represent a schematic illustration during a half-cycle of its operation.
Figure 14:
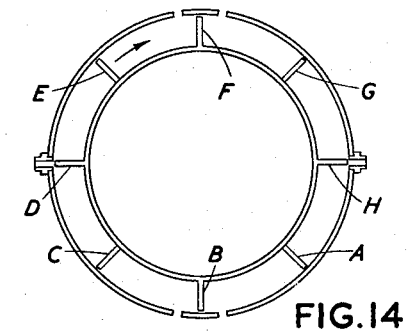

Under the impulsion of the succeeding expansion due to combustion in chamber H—A the vane B moves just clockwise of 180° while the vane A is moving to a position just counter-clockwise of 180° as shown in Figures 13 to 15. During the large proportion of this travel the chamber A—B has been contracting and has been open to exhaust port 94 where the combustion products are expelled.

Continuing the cycle vane B moves away from vane A opening the chamber to air intake port 95, and a similar cycle to that described is repeated while the piston vanes A—B describe the other 180° of the cycle to reach again their position as shown in Figure 7.

Moreover the operations taking place in chamber A—B at any time are identical to those taking place in chamber E—F at a location 180° removed, and each of the eight chambers comprising combustion chamber 16 go through the above operations during a cycle.

Similarly the chamber 18 is comprised of similar vanes and chambers although the oscillation between rotors 37—39 of chamber 18 is displaced 22½° from the oscillation of chamber 16. Thus for every rotation of shaft 71 there are 16 firings of the various vane chambers at 22½° intervals.

The above describes the operation of the device as an engine. If a use is to be made of the products of combustion issuing from exhaust ports 91, 94 then these may be connected to a suitable device such as a turbine to be driven by such gases. Thus the device is operable as a compressor as well as an engine. Since a double coupling is used the ratio is equivalent to a 4:1 gear ratio and the vanes will approach and recede four times during the rotation of the rotors through 360°. Had only a single coupling been used the ratio would have been 2:1 and the spacing of ports and firing mechanism would have been appropriately changed.

Rigidly connected to the support member 33 is a shaft 71 which projects through end plate 12 for connection to a power take off.

When the motor is in operation the firing of fuel mixture between adjacent pistons causes them to separate and rotate the crank shaft 29. Rotation of the crank shaft rotates the two coupling members so that coupler 26 physically moves about the intersection of grooves 14 as it rotates. This movement causes rotation of the block 20 at ¼ the speed of rotation of crank shaft 29. The inertia of rotating block 20, supports 35 and 33 and the connecting assembly will continue the rotation causing corresponding rotation of crankshaft 29 and the approach and recession of the pistons for the necessary cycle of the combustion engine.

The embodiments of the invention in which an exclusive property or privilege is claimed are defined as follows:

1. A rotary internal combustion engine comprising: an annular combustion chamber, a pair of rotors for said chamber, an equal number of pistons mounted on each said rotor for movement in said chamber, the said pistons on said rotors alternating about the circumference of said chamber, means for connecting said rotors together adapted to cause said pistons to approach and recede from each other as they revolve around inside said combustion chamber, including: a number of equiangularly spaced intersecting grooves perpendicular to the axis of said rotors, rigidly located relative to said pistons with said intersection on the axis of said annulus, a cylindrical block rotatably mounted co-axially with said annulus, a coupling member eccentrically and rotatably mounted in said cylindrical block, a number of studs corresponding to said number grooves in said coupling member each being adapted to ride in one of said intersecting grooves during the rotation of said cylindrical block, and a crank arm comprising the means adapted to cause the approach and recession of said pistons geared to said coupling member.

2. A rotary internal combustion engine as claimed in claim 1, wherein a housing defines said combustion chamber and said housing slidably mounts said rotors.

3. A rotary internal combustion chamber as claimed in claim 1 wherein a radial slot is cut in each rotor to slidably receive a block mounted on the crank arm.

References Cited in the file of this patent

UNITED STATES PATENTS

| | | |
|---|---|---|
| 1,497,481 | Bullington | June 10, 1924 |
| 1,729,242 | Bregere | Sept. 24, 1929 |
| 2,553,954 | Bancroft | May 22, 1951 |

FOREIGN PATENTS

| | | |
|---|---|---|
| 265,095 | Germany | Oct. 3, 1913 |

OTHER REFERENCES

"Mechanics of Machinery" (Ham and Crane), published by McGraw-Hill (New York and London), 1927. (Page 29 relied on.)